United States Patent
Lindley

[15] 3,682,219
[45] Aug. 8, 1972

[54] SUPPORT BELT FOR DEFLATED TUBELESS TIRE

[72] Inventor: William L. Lindley, P.O. Box 58584, Houston, Tex. 77058

[22] Filed: April 10, 1970

[21] Appl. No.: 27,379

Related U.S. Application Data

[63] Continuation-in-part of Ser. No. 821,901, May 5, 1969, abandoned.

[52] U.S. Cl. ................................................152/158
[51] Int. Cl. .........................................B60c 17/04
[58] Field of Search.....................................152/158

[56] References Cited

UNITED STATES PATENTS

| | | | |
|---|---|---|---|
| 3,180,391 | 4/1965 | Lindley | 152/158 |
| 3,394,749 | 7/1968 | Lindley | 152/158 |

*Primary Examiner*—Arthur L. La Point
*Assistant Examiner*—George H. Libman
*Attorney*—Jack W. Hayden

[57] ABSTRACT

A support belt comprising a support member positioned inside a tubeless tire and extending circumferentially about the rim on which the tire is mounted for engaging the tire when it is deflated to prevent the rim from damaging the sidewalls and tread portion of the tire wherein the support member comprises a continuous band encircling the rim and releasably secured or positioned relative thereto by means which are adapted to release when the weight of the vehicle is imposed on the support member upon deflation of the tire to enable the support member to thereafter freely move radially and circumferentially relative to the rotating rim to inhibit damage to the deflated tire.

13 Claims, 6 Drawing Figures

William L. Lindley
INVENTOR

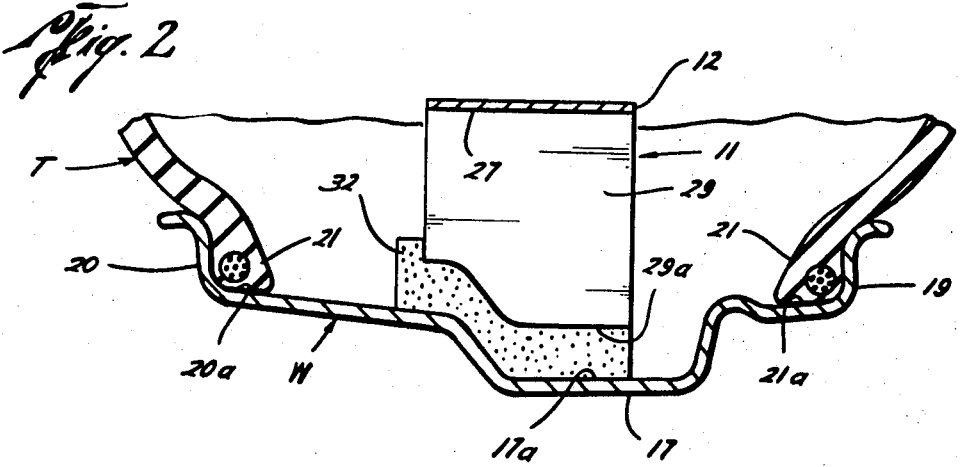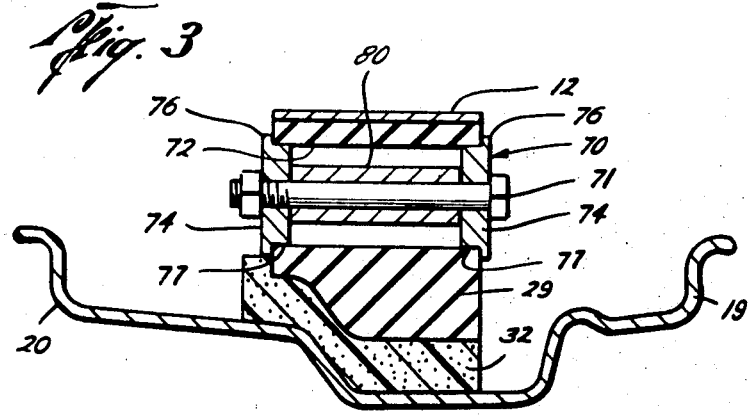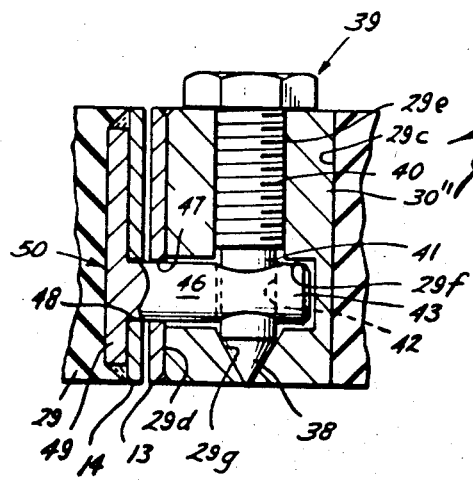

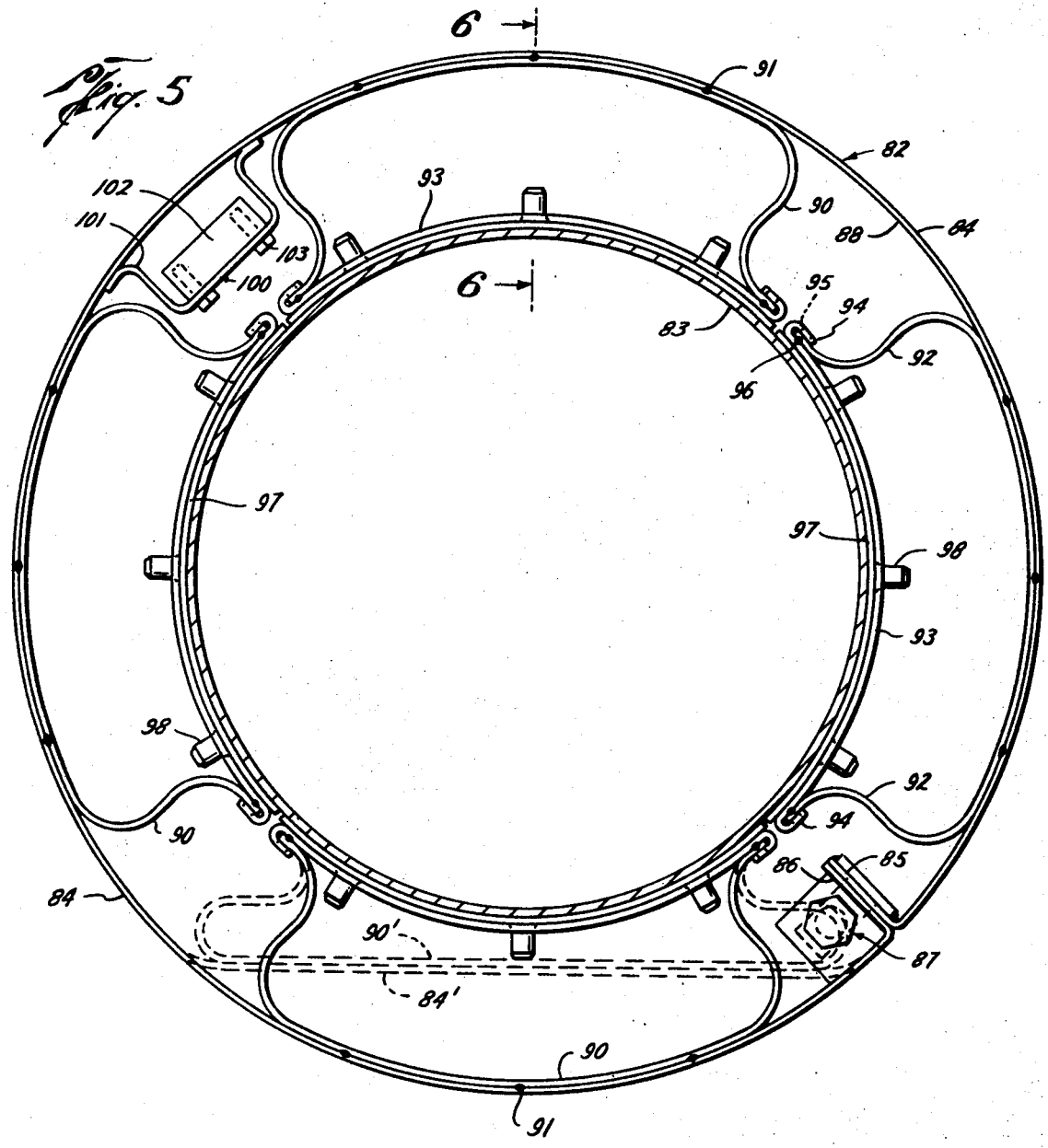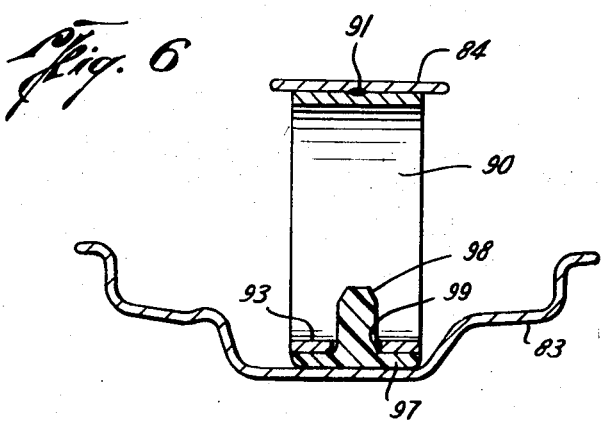

3,682,219

SUPPORT BELT FOR DEFLATED TUBELESS TIRE

CROSS-REFERENCE TO RELATED APPLICATION

This application is a continuation-in-part of copending application Ser. No. 821,901, filed on May 5, 1969, now abandoned.

BACKGROUND OF THE INVENTION

1. Field of the Invention

The present invention relates to a support belt for use with tubeless tires which will permit driving on a tire for at least a limited distance when it is deflated wherein the support belt is releasably positioned relative to the wheel rim on which the tire is mounted by frangible, collapsible, break-away or slipable means which when the tire becomes deflated, releases the support so that it moves freely relative to the wheel rim. In one embodiment, such releasable means preferably comprises circumferentially extending pads or strips of frangible or collapsible material, such as rigid polyfoam, closed cell urethane foam, or foam rubber or other suitable means which will position the support in a predetermined radially spaced relationship to the wheel rim during normal inflation of the tire but which will collapse, fracture, shear, or otherwise break away when the weight of the vehicle is imposed thereon by deflation of the tire to thereafter enable the support belt to move freely as the rim rotates to aid in passing the deflated tire between the rim and the surface over which it is moving. In another embodiment, such releasable means preferably comprises a material, such as, by way of example only, Teflon, having a self-lubricating characteristic with respect to metal when forced to slide thereagainst.

2. Description of the Prior Art

There are various supports or safety inserts in the prior art which are provided for use in tubeless tires and which are secured to a wheel rim so as to support the wheel rim when a tire is deflated to thereby prevent the rims of the wheel from cutting and damaging the deflated tire when the vehicle is driven thereon.

Such prior art includes, for example, U.S. Letters Pat. Nos. 2,986,189; 3,135,556; 3,141,490; 3,142,326; 3,180,391; 3,327,677; and 3,394,749. While these various wheel rim supports or tire insert devices provide supporting means for a vehicle wheel rim which will prevent the wheel rim from damaging the sidewalls or body of a tire in the event the tire becomes deflated so as to permit the vehicle to be driven on the deflated tire, in each of these prior art devices the supporting member is anchored to the wheel rim and is not freely movable with respect thereto. When the tire is deflated, the tread portion of the tire tends to bunch up or fold over in front of that part of the wheel rim which is adjacent the ground or roadway thereby tending to damage or cut the tire. While the prior art structures such as disclosed in U.S. Letters Pat. No. 3,327,677 and in U.S. Letters Pat. No. 3,142,326 tend to eliminate this difficulty, it has been found that a smoother flow or passage of the wheel rim and the tire body may be afforded by the present invention, which permits free movement and rotation of the wheel support as necessary relative to the wheel rim and also to the tire when the tire becomes deflated. The present invention also may aid in reducing the tendency of the tire tread portion as well as the sidewalls of the deflated tire to bunch up or fold over immediately in front of that portion of the tire which is either directly in front of or beneath the part of the wheel rim contacting the roadway.

SUMMARY OF THE INVENTION

The present invention provides a new and improved apparatus for supporting a wheel rim and a deflated tubeless tire mounted thereon to thereby permit the vehicle to be driven without excessive damage to the sidewalls or the tread portion of the deflated tire carcass.

The apparatus of the present invention includes a continuous support band adapted to be carried on a wheel rim to support the wheel rim when the tire is deflated. The continuous band extends circumferentially about the wheel rim and is releasably secured or positioned relative thereto so that when the tire deflates and the weight of the vehicle is imposed upon the band, the securing apparatus releases to permit the band to thereafter move radially and also circumferentially with respect to the wheel rim as the rim continues to roll when the vehicle moves. Thus, the wheel rim support of the present invention is permitted to freely turn or move relative to the wheel as necessary so as to aid in feeding the tread portion and sidewall portion of the tire past the point of contact between the roadway and the wheel as the wheel rolls along the roadway to thereby tend to protect the tire from cutting or abrasion.

Another object of the present invention is to provide a new and improved wheel rim support for deflated tubeless tires comprising a continuous spring steel strip having a rim engaging means on the inside of the strip. The rim engaging portion or means aids in keeping the support centered relative to the rim as the rim rotates when the tire is inflated, and also centers the support on the rim when the tire is deflated.

Another object of the present invention is to provide a new and improved wheel rim support belt for deflated tubeless tires comprising a continuous spring steel strip having a rim engaging means and means connecting the ends of the strip when the support is secured to the wheel.

Another object of the invention is to provide an arrangement for mounting on a wheel rim of a vehicle which is freely movable as necessary radially and circumferentially relative to the rim while remaining centered relative to the sides of the rim when the tire deflates to enable the vehicle to continue to move even though the tire is deflated.

Another object of the invention is to provide an arrangement for mounting on a wheel of a vehicle which is initially secured or positioned on the rim but which becomes freely movable radially and circumferentially relative to the rim when the tire deflates to aid in passing the deflated tire between the rim and surface along which the vehicle is moving to inhibit damage to the tire.

BRIEF DESCRIPTION OF THE DRAWINGS

FIG. 2 is a sectional view taken on line 2—2 of FIG. 1 showing details of construction of the support apparatus of the present invention;

FIG. 3 is a sectional view taken on line 3—3 of FIG. 1 showing details of one form of a balancing means for balancing the wheel rim support apparatus in a tubeless tire;

FIG. 4 is a sectional view on line 4—4 of FIG. 1 showing a form of connecting means for connecting the ends of the continuous band of the wheel rim support apparatus to secure the band to the wheel rim;

FIG. 5 is a side elevation, partly in section, showing a second embodiment of a wheel rim support belt constructed in accordance with the present invention; and FIG. 6 is a sectional view taken on section line 6—6 of FIG. 5.

DESCRIPTION OF THE PREFERRED EMBODIMENTS

Figure 1:
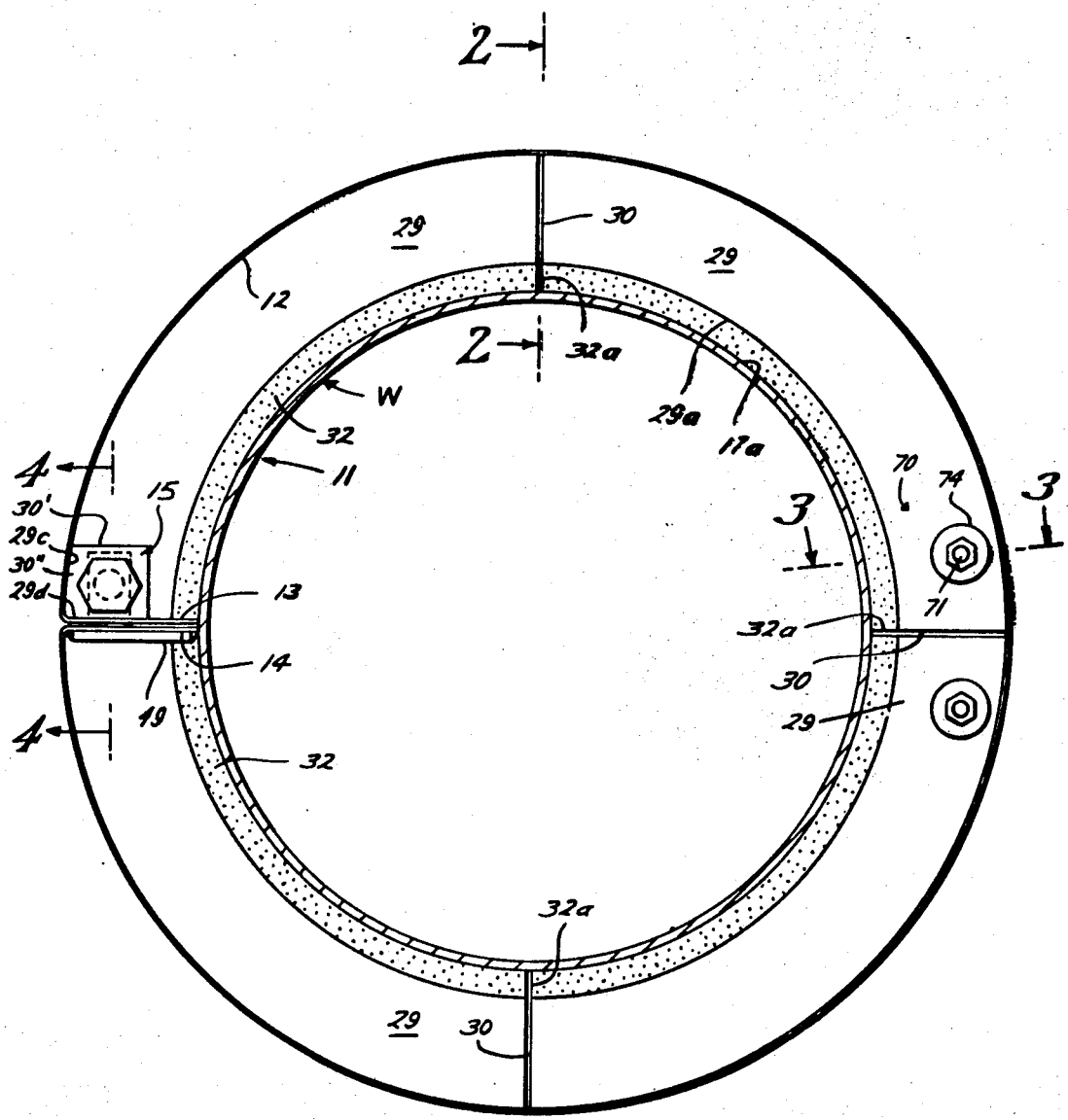
FIG. 1 is a side elevation, partly in section, showing a first embodiment of a wheel rim support belt of the present invention in position on a wheel rim.

One embodiment of the support belt or band of the present invention is indicated generally at 11 in FIG. 1 of the drawings. Such support band 11 comprises a continuous metal band 12 which encircles a wheel rim W and which has its ends 13 and 14, respectively, turned inwardly and connected together by connecting means, indicated generally at 15, which will be described in detail hereinafter. In FIG. 2 of the drawings, the wheel rim is shown as being a typical drop-center type wheel rim represented at W and the continuous band 12 is positioned adjacent the central portion 17 between laterally spaced upstanding rim flanges 19 and 20 which extend circumferentially of the rim W and receive the beads 21 of the tire T, thereagainst and on the bead edges 20a and 21a of the rim W.

Generally, the support band 11 includes a band or strip of spring steel 12 or other suitable material which is preferably preformed so that it normally urges its ends 13 and 14 toward each other.

Secured to the inner surface 27 of the band 12 by any suitable means such as by bonding or vulcanizing or bolts is a circumferentially extending strip 29 which is preferably formed of hard material such as an elastomer or rubber of approximately 70 to about 95 durometer. As shown, the strip 29 on the band 12 is provided with circumferentially spaced grooves 30 extending through the strip 29 to facilitate installation and removal of the device 11 on the wheel rim W. Also as shown, there are four grooves extending radially through the strip 29, but they may extend at any suitable angle and fewer or more grooves 30 may be provided as desired. Disposed between the inner surface 29a of the strip 29 and surface 17a of the center portion 17 of the drop-center rim W is release means represented by a strip 32 formed of collapsible, or frangible, or break-away material which will shatter, disintegrate, compress, or shear or tear when the weight of the vehicle is applied to the support 11 upon deflation of the tire T. The release strip 32 may be formed of a material such as, for example, rigid polyfoam, closed cell urethane foam, foam rubber, or other suitable material having the desired characteristics. The strip 32 is also provided with grooves 32a therethrough which coincide with grooves 30 in strip 29, when it is secured to the strip 29.

When the weight of the vehicle is applied to the support 11, the release strips 32 are crushed, collapsed, or separated relative to the strip 29 so as to permit the band 12 and strip 29 to rotate as a unit or move circumferentially and radially as necessary relative to the wheel rim W on which the tire T is carried. Also, by being free to rotate, as well as move circumferentially and radially, the tire support 11 facilitates passage of the deflated tire T beneath the wheel rim as the wheel rim W is rotated.

As shown in FIG. 1 of the drawings, the wheel support 11 is secured on the wheel W by means of tensioning or connecting means 15 which connects together the inwardly turned opposite ends 13 and 14 of the spring metal strap or band 12. The elastomer segment 29 adjacent the band end 13 is cut away at 30' and a nut 30'' is in the cutaway 30' which nut is secured at its edges 29c and 29d to the strip 12 and its bent end, respectively, as shown in FIG. 1.

As shown in FIG. 4, the nut 30'' is provided with a threaded bore 29e and a slot 29f which extends laterally of the nut 30''. The end of the nut 30'' terminates in a guide slot 29g to receive the end 38 of the bolt 39, as shown in FIG. 4. The bolt 39 is provided with a threaded portion 40 to engage the threads 29e of nut 30'' and a smooth surface 41 which extends through opening 42 of connection 43 and which conforms to the shape of the guide slot 29g at the end of the bolt 39. The connector 43 fits within slot 29f and is provided with a shank 46 that extends through openings 47 and 48 in 13 and 14, respectively, and is connected with stiffener or backup member 49 that abuts 14. The member 50 comprising backup plate 49, shank 46, and connector 43 may be secured to end 14 before elastomer 29 is positioned on band 12.

After positioning the support 11 within the central portion 17 of rim W so that the ends 13 and 14 of support 11 are adjacent each other, the connector 43 is inserted through opening 47 and into slot or opening 29f of nut 30''. The bolt 39 is inserted and rotated to secure the support 11 adjacent the center 17 of rim W. This retains the strip of breakaway material 32 of the support 11 in position against the center 17 of the drop-center rim W.

Attention is directed to FIG. 1 of the drawings wherein a form of balancing means 70 is provided on the opposite side of the rim W from the connecting means 15. Such balancing means 70 are best seen in FIG. 3 of the drawings wherein it will be observed that the balancing means 70 as illustrated comprises a bolt 71 which extends through an opening or a passage 72 in the inner strip or segment 29. The bolt 71 is mounted in a pair of spaced plugs 74 which is positioned in each end of the passage 72. Such plugs are provided with an inner portion 77 which is of smaller diameter to fit within the opening 72 and extend inwardly thereof and with a larger diameter shoulder portion 76 which engages the sides of the segment 29 adjacent the opening 72. A tubular sleeve 80 is provided on the bolt 71 between the plugs 74 which may be of the desired weight to counterbalance weight of the connecting means 15 so that the wheel support 11 is balanced on the rim W.

In use, the support apparatus 11 of the present invention may be positioned on a wheel W by expanding the spring steel band 12 to fit it over the rim flanges 19 or 20 and around the center portion 17 of the rim. The connector is extended through opening 47 and into opening or slot 29f of nut 30". The bolt 39 is then engaged by a lug wrench or any other means to rotate it and threadedly engage it in the nut 30".

The breakaway material 32 may either be separately positioned on the center portion 17 of the rim W prior to placing the band 12 around the rim so as to abut the strip of breakaway material 32 and strip 29 or if desired the strip of breakaway material 32 may be secured to the inner surface of the arcuate strip 29. In either event, with the breakaway material in position abutting the drop-center portion of the rim W, the band 12 with the strip 29 extending therearound is positioned to abut the material 32 and connecting means 15 is tightened by rotating the bolt 39 to engage it in the nut 30" to cause the band 12 to compress and secure the support 11 to the rim.

Thereafter, the tubeless tire T may be placed on the rim W and inflated in the normal manner. Should the tire subsequently become deflated in operation, the wheel support apparatus 11, which is releasably secured to the rim W, will be released therefrom when the weight of the vehicle is imposed on such support apparatus 11 causing the strip of breakaway material 32 to become crushed or sheared to thereby permit the support 11 to rotate and move freely as necessary both radially and circumferentially relative to rim W. The movement of support 11 relative to rim W facilitates or aids in the passage of the tire T beneath that portion of the wheel rim W in contact with the roadway.

It is noted that the inner surface 29a of elastomer strip 29 is of the same configuration as the surface 17a of the center portion 17 of the rim W so that as the rim W rotates, the inner surface 29a is engaged against surface 17a where the rim and deflated tire contact the surface over which they are moved. Since the surfaces 29a and 17a are complementary, the support 11 is thus properly positioned as the wheel rim W rotates with the deflated tire thereon.

The connecting means 15 extends laterally relative to the band 12, and as shown, extends at a right angle relative thereto. This facilitates the insertion and removal of the device since the arrangement of the connecting means in this manner is more accessible.

Referring now to FIGS. 5 and 6, there is shown a further embodiment of a wheel support or wheel belt constructed in accordance with the present invention. The wheel support or wheel belt is generally indicated by reference numeral 82 and is shown as being mounted on a wheel rim 83. The support belt 82 includes a flexible metal band 84 extending circumferentially of the rim 83. The free ends 85 and 86 of the metal band 84 are secured to one another by means of a connector mechanism 87 which is of the same construction as the connector 15 of the earlier embodiment.

The wheel support belt 82 further includes positioning means secured to the inner periphery 88 of the metal band 84 for maintaining the metal band 84 in a spaced, coaxial relationship with respect to the wheel rim 83 during normal inflation of the tire. This positioning means comprises resilient or flexible metal strip means having portions which extend inwardly of the metal band 84 at spaced locations around the circumference thereof. This metal strip means includes a plurality of bowed spring members 90 having their mid parts secured to the inner periphery 88 of the metal band 84, such securing being accomplished, for example, by way of spot welds 91. The two ends 92 of each bowed spring member 90 extend inwardly towards the wheel rim 83. A plurality of curved tension strips 93 is individually fastened between the two ends 92 of different ones of the bowed spring members 90. The ends of each of these tension strips 93 are bent to provide hook portions 94 which are hooked over the ends of the corresponding spring member 90 to maintain such spring member 90 in a bowed condition. A hole or opening 95 is provided in each hook portion 94 for enabling spot welding of the spring member 90 to the tension strip 93, the spot weld being indicated at 96. The concave sides of the tension strips 93 face inwardly towards the wheel rim 83 and the radius of curvature thereof is just slightly greater than the radius of curvature of the wheel rim 83.

The wheel support belt 82 also includes release means disposed between the tension strips 93 and the rim 83 and operable when the tire deflates to accommodate movement of the wheel support belt 82 relative to the rim 83 when the tire is in a deflated condition and the automobile on which the tire is mounted is undergoing movement. This release means is comprised of strips of plastic material 97 which are individually secured to the concave sides of different ones of the tension strips 93 by means of integral retainer nipples 98 formed thereon which are inserted into cooperating holes or openings 99 (FIG. 6) in the tension strips 93. The release strips 97 and integral nipples 98 are formed of a plastic material having a self-lubricating characteristic with respect to metal when such material is forced to slide across such metal. The plastic material for the release strips 97 may take the form of, for example, a material or plastic having the characteristics of, Teflon material. The retainer nipples 98 facilitate the replacement of the strips 97 when they become worn.

A weight balancing device 100 is secured to the inner periphery of the metal band 87 on the side thereof opposite the connector mechanism 87. This balancing device 100 includes a support frame 101 which is spot welded to the metal band 84 and a weight member 102 which is secured to the inward loop thereof by bolts 103. The weight member 102 is of the desired weight to counterbalance the weight of the connector mechanism 87.

The metal band 84 and the bowed spring members 90 are preferably comprised of spring steel. The tension members 93 may be, but need not be, formed of spring steel material.

During normal inflation of the tire, the wheel support belt 82 is clamped to the wheel rim 83 with sufficient tension or force such that the wheel support belt 82 rotates in unison with the rim 83 during operation of the automobile. In other words, when the tire is properly inflated, there is no relative movement of the wheel support belt 82 relative to the rim 83. At such time, the tire remains spaced from the support belt 82 and there is no contact therebetween. When the tire becomes deflated, however, the portion of the tire in contact with the ground surface is urged inwardly against the wheel support belt 82 with a considerable force. Thus, the flexible metal band 84 and lowermost one or ones of the bowed spring members 90 are collapsed inwardly as indicated by the dash-line constructions 84' and 90' in FIG. 5. Continued movement of the automobile with the tire in this deflated condition produces a rotational slippage of the rim 83 relative to the release bands or strips 97, the self-lubricating characteristic or low dynamic coefficient of friction of these strips 97 serving to facilitate this relative rotational slippage. Thus, the wheel support belt 82 can slip forward or backward relative to the rim 83 to enable a bunched up portion of the tire to pass between the rim 83 and the ground surface.

A particular feature of the present embodiment is that the wheel support belt 82 occupies a minimum of volume of the space within the tire. In other words, the open, framelike construction of the wheel support belt 82 causes a minimum of displacement of the air volume normally within the tire. This is important because a tire is manufactured to perform with a specific configuration to the sidewall and tread thereof when a particular volume and pressure of air is present in the tire. If, therefore, a lesser volume of air is used because of the presence of the wheel support of the prior art, then the pressure of the air remaining must be increased to try to maintain the same tire shape or design configuration. Such a pressure increase causes a harder ride and thus reduces the comfort factor. With the relatively open, framelike construction of this embodiment, the reduction in air volume is held to a minimum, thus minimizing the need for an increase in air pressure.

A feature of both of the illustrated embodiments is that no rubber or other relatively easily destructible material is located on the outer surface of the outer metal band. This considerably increases the number of miles that the wheel belt is capable of traveling without suffering serious deterioration.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A support belt adapted to be used in a tubeless tire to support a wheel rim when the tire thereon becomes deflated, comprising:
   a. generally circular support means extending circumferentially of the rim and projecting radially outwardly beyond the wheel rim, said support means including a flexible band; and
   b. releasable means positioning said support means relative to the rim during normal inflation of the tire and operable when the tire deflates to accommodate movement of said support means relative to the rim as the rim rotates with the deflated tire against a surface, said releasable means including a self-lubricating material between said band and rim for accommodating relative movement between said band and rim when the tire is deflated.

2. A support belt adapted to be used in a tubeless tire to support a wheel rim when the tire thereon becomes deflated, comprising:
   a. generally circular support means extending circumferentially of the rim and projecting radially outwardly beyond the wheel rim, said support means including a flexible band;
   b. releasable means positioning said support means relative to the rim during normal inflation of the tire and operable when the tire deflates to accommodate movement of said support means relative to the rim as the rim rotates with the deflated tire against a surface, said releasable means including a self-lubricating material between said band and rim for accommodating relative movement between said band and rim when the tire is deflated;
   c. means for securing said support means in position on the rim; and
   d. said support means including a metal band extending circumferentially of the rim and wherein said securing means includes:
      1. nut means secured to one end of said band and having an opening extending laterally relative thereto;
      2. connector means secured to the other end of said band and extending across the first end of said band and having an opening coincident with the opening of said nut; and
      3. bolt means for engaging said nut and connector to lock said band on the rim.

3. The invention of claim 1 wherein said releasable means comprises plastic material disposed between the support means and the rim and having a self-lubricating characteristic with respect to metal.

4. The invention of claim 1 wherein said releasable means comprises Teflon material disposed between the support means and the rim.

5. A support belt adapted to be used in a tubeless tire to support a wheel rim when the tire thereon becomes deflated, comprising:
   a. a metal band extending circumferentially of the rim;
   b. means securing the ends of said metal band together to form a continuous band;
   c. positioning means secured to the inner periphery of said metal band for maintaining said metal band in a spaced apart coaxial relationship with respect to the rim during normal inflation of the tire; and
   d. release means disposed between the positioning means and the rim and operable when the tire deflates to accommodate movement of the positioning means relative to the rim as the rim rotates with the deflated tire against a surface, said release means comprising plastic material having a self-lubricating characteristic with respect to metal when forced to slide thereagainst.

6. The invention of claim 5 wherein the release means comprises Teflon material.

7. The invention of claim 5 wherein the positioning means comprises resilient metal strip means having portions which extend inwardly of the metal band at spaced apart locations around the circumference thereof.

8. The invention of claim 5 wherein the positioning means comprises a plurality of bowed spring members which extend inwardly toward the wheel rim.

9. The invention of claim 5 wherein the positioning means comprise:
   a. a plurality of bowed spring members having their mid parts secured to the inner periphery of said metal band with the two free ends of each bowed spring member extending inwardly toward the wheel rim; and
   b. a plurality of curved tension strips individually fastened between the two ends of different ones of the bowed spring members, the concave sides of such tension strips facing inwardly toward the wheel rim.

10. The invention of claim 9 including release means secured to the concave sides of the tension strips and operable when the tire deflates to accommodate movement of the tension strips relative to the rim as the rim rotates with the deflated tire against a surface.

11. The invention of claim 10 wherein the release means comprises strips of plastic material.

12. The invention of claim 10 wherein release means comprises strips of Teflon material.

13. The invention of claim 12 wherein the strips of Teflon material are provided with radially-extending retainer nipples which are located in cooperating holes or openings in the tension strips, such construction facilitating the replacement of the strips of teflon material when same becomes worn.

* * * * *